May 20, 1941.  O. PANENGEN  2,242,479
TRACTOR-DRIVEN PLOW
Filed May 17, 1939
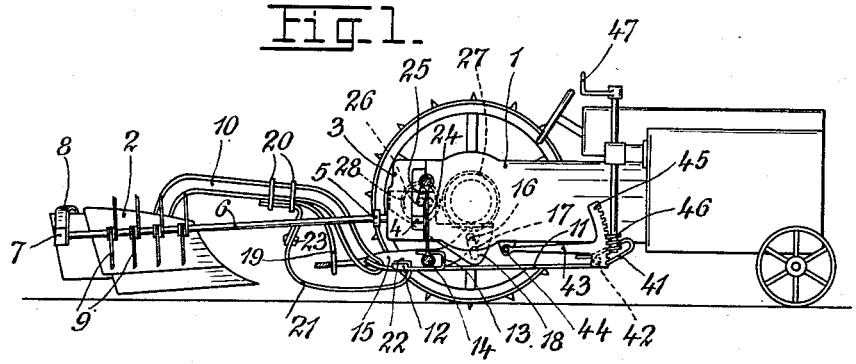
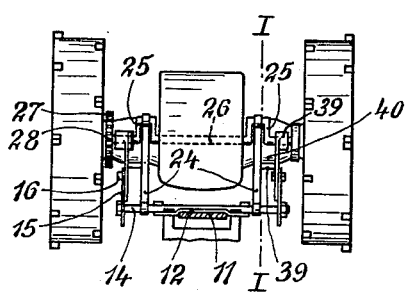
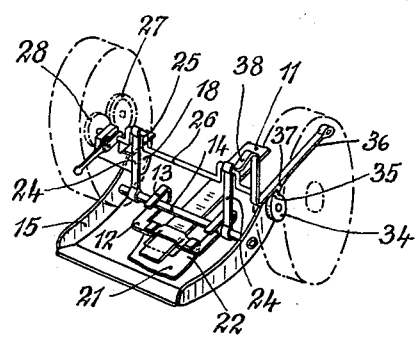
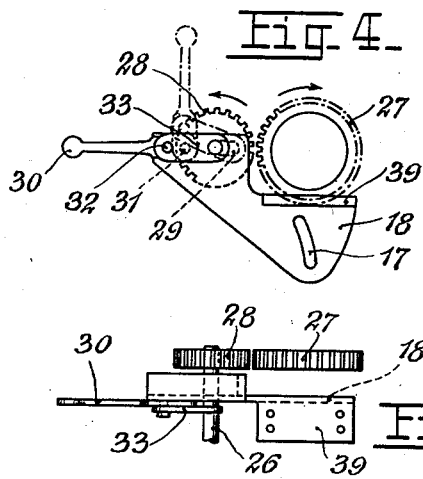
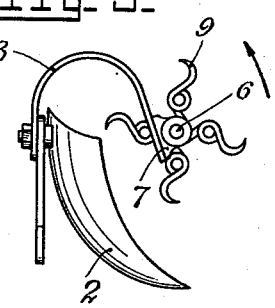
Inventor,
O. Panengen
By: Glascock Downing & Seebold
Attys.

Patented May 20, 1941

2,242,479

UNITED STATES PATENT OFFICE 2,242,479

TRACTOR-DRIVEN PLOW

Oscar Panengen, Skreia, Norway

Application May 17, 1939, Serial No. 274,249
In Norway May 23, 1938

8 Claims. (Cl. 97—38)

The present invention consists in a tractor-driven plow in combination with a rotary cultivator, and the characteristic feature of the arrangement is that the cultivator elements are arranged on a shaft which extends in the longitudinal direction of the plow, so that the cultivator operates on the earth as it passes away from the breast of the plow.

The invention further concerns a lifting arrangement for the plow which is mounted on the tractor and is arranged in such a manner that the power for raising the plow is derived from the driving wheel of the tractor.

The invention is illustrated in the accompanying drawing, in which

Fig. 1 is a side elevation of the plow partly in section on the line I—I in Fig. 2, Fig. 2 is an end elevation of the raising means on the tractor, Fig. 3 is an end view of the plow proper, Fig. 4 shows a detail in side elevation, Fig. 5 is a plan view of Fig. 4, and Fig. 6 is a perspective view of the raising mechanism.

Referring to the drawing, 1 is the rear end of the tractor and 2 is the plow which is connected to the tractor. The arrangement is devised so that it can be fitted to an ordinary tractor and the latter is provided with a gear box 3 to allow the shaft of the rotary cultivator to be rotated at a suitable speed, the said gear box being fixed on the rear end surface of the tractor and receives the end of the axle 4 which projects from the tractor. From the gear box a short shaft extends which terminates in a universal coupling 5 and is continued in a shaft 6 which at its rear end is journalled in a bearing 7 which is fixed on an arm 8 rigidly connected to the plow. The arm is curved as shown in Fig. 3 so that the shaft 6 is capable of a certain amount of resilient movement. On the shaft 6 are fitted the cultivator elements 9 which consist of ordinary claw-like fingers or tines as shown in Fig. 3. The rotary cultivator operates in the direction shown in the arrow in Fig. 3 and since the cultivator elements extend alongside the breast of the plow, after the earth has passed over the breast of the plow the rotary cultivator will finely divide and scatter the earth, so that the earth will be deposited in the form of a uniform and pulverized layer.

The beam 10 of the plow is bent downwardly at its forward end and is connected to a flat bar 11 which extends in under the rear part of the tractor. A member 12 is fixed to the bar 11, the said member having two forwardly directed branches the ends of which are bent rearwardly so as to form bows 13. These bows 13 engage around the bar 14 which at its two ends is connected with the traction bow 15, the ends of which are provided with bolts 16 which engage in slots 17 in a part 18 fixed on the tractor. The traction bow transmits the tractive effort from the tractor to the plow, preferably through the intermediary of a resilient member which comprises a spring arm 19 which is fixed to the beam by means of straps 20. The free end of the spring arm 19 lies against the rear part of the traction bow 15 so that when the tractor commences to draw, the spring arm 19 will yield and thereby prevent the plow from being dragged forward with a jerk. When the spring arm has yielded a certain amount it will bear against the downwardly bent part of the beam of the plow, so that it will not be subjected to any overloading.

The straps 20 also serve for securing a supporting element 21 having a lightly curved part which is arranged to lie against the earth and hold the plow at the correct height. The supporting element is at its front end shaped to form two bows 22 which are rigidly connected to the part 12. Furthermore the supporting element 21 is constructed in two parts which are connected to one another by means of a bolt 23, the connection being effected in such a manner that adjustment can be effected for imparting different height settings to the supporting element 21.

The bar 14 which passes transversely across the traction bow 15 is connected by means of two straps 24 to crank pins 25 on a shaft 26, which is arranged in the space between the gear box 3 and the rear side of the tractor. The shaft is journalled on each side of the tractor and serves for raising the plow from the earth when the shaft has a half turn imparted to it. In the position shown in the drawing the plow is situated in the raised position. The half turn of the shaft which is effected for raising the plow when it is situated in the lowered position is effected by means of gear wheels 27 and 28. The gear wheel 27 is constructed as a ring which is fixed on the wheel of the tractor itself. The gear wheel 28 which is fixed on the end of the shaft 26 is provided with teeth which extend only over half its periphery, and the gear wheel is displaceable sideways so that it can be brought into engagement with the gear wheel 27 and brought out of engagement therewith again after it has made a half rotation. For this purpose the bearing for the shaft 26 is formed as a slot 29. The other end of the shaft 26 is provided with such a large clearance in its bearing that during the displacement of the gear wheel 28 the shaft executes a small swinging movement about the said bearing.

An arm 30 serves for imparting the lateral displacement to the shaft. The said arm is pivotally mounted on a stud 31 fixed in the wall of the bearing and in addition thereto is pivotally connected by means of a stud 32 with a link 33 in the other end of which a hole is provided which surrounds the shaft 26. In broken lines in Fig. 4, the arm 30 is shown in the position which it occupies when the gear wheels 27 and 28 are brought into engagement with one another. The shaft 26 is located in the right-hand end of the guide 29 and the crank pins 25 extend downwardly. The gear wheel 27 rotates together with the driving wheel of the tractor and when the gear wheel 28 arrives at the position where the teeth terminate it will be forced to the left owing to the teeth on the wheel 27 pressing against the part of the periphery of the wheel 28 which is not provided with teeth and has the same radius as the tops of the teeth. Under this sideways displacement the link 33 will press against the arm 30 which is thereby swung back to the position which is shown in full lines.

When the arm is swung a little to the side it will under its own weight fall down completely and thereby pull the shaft 26 with it to effect the final part of the uncoupling.

The two gear wheels 27 and 28 co-operate in such a manner that disengagement takes place immediately before the crank pins 25 reach their dead centre positions and the shaft 26 may for this purpose be provided with a locking device to prevent it from turning backwardly again. This locking device may comprise a disc 34 (Figs. 2 and 6) which is provided with a projection 35 which co-operates with a locking arm 36 provided with a hook 37. The arm 36 is pivotally mounted on the side wall of the tractor and rests freely upon the disc 34. As soon as the shaft 26 has rotated so far that the crank pins 25 are in proximity to their dead centres, the locking projections 35, 37 come into engagement with one another, the shaft 26 being prevented from turning backwardly. When the plow is to be lowered again the locking projections are released by raising the arm 36 with the aid of the handle 38.

The bearings for the shaft 26 are formed in the walls 18 which also serve for receiving the traction bow 15. On each of the walls is formed a fixing plate 39 which is bolted fast to an abutment surface 40 on the axle casing of the tractor.

The flat bar 11 which extends under the tractor is at its forward end formed into a bow 41 which receives a bar 42 which extends transversely across the full width of the tractor and is connected at each side to an arm 43 which is keyed on a shaft 44 which also extends over the full width of the tractor. One of the arms 43 is provided with a toothed sector 45 which coacts with a worm 46, the spindle of which is provided with a crank handle 47. When the worm 46 is turned the bar 42 which is in engagement with the bow 41 will move the forward end of the bar 11 up or down, by turning around the bar 14 and the plow will be lowered or raised, respectively. With the aid of this adjusting arrangement the depth of the plow can be regulated. When the plow has been adjusted to the required depth, the sliding support 21 can be adjusted to lie against the ground with the aid of the bolt 23. By this means the adjusting arrangement at the forward end of the bar 11 is relieved from stresses set up by the plow.

What I claim is:

1. A tractor-driven plow in combination with a cultivator comprising a shaft extending in the longitudinal direction of the plow and a plurality of cultivator elements on said shaft arranged to operate on the earth which passes away from the breast of the plow, a resilient arm fixed to the plow and a bearing on said arm for the rear end of said shaft.

2. A tractor-driven plow comprising the combination as set forth in claim 1 with a bar connected to the beam of the plow and extending in under the rear part of the plow, lifting means for said bar including a rotatable shaft extending transversely across the tractor and having cranks thereon and straps connected to said cranks and bar for suspending the bar from the lifting means.

3. A tractor-driven plow comprising the combination as set forth in claim 1 with a bar connected to the beam of the plow and extending in under the rear part of the tractor, lifting means for said bar, comprising a rotatable shaft extending transversely across the tractor and having cranks thereon, a gear wheel actuatable by a driving wheel of the tractor, a gear wheel fixed on said shaft and movable into and out of engagement with said first-mentioned gear wheel and straps connected to said cranks for suspending said bar from the lifting means.

4. A tractor-driven plow comprising the combination as set forth in claim 1 with a bar connected to the beam of the plow and extending in under the rear part of the tractor, lifting means for said bar, comprising a rotatable shaft extending transversely across the tractor and having cranks thereon, a gear wheel actuatable by a driving wheel of the tractor, a gear wheel fixed on said shaft at one end thereof, a bearing slot on the tractor for the end of said shaft at which the gear wheel thereon is fixed, an actuating arm pivoted on the tractor, a link connected to said actuating arm and to said shaft, so as to enable said end of the shaft to be displaced sideways in the bearing slot on the actuating arm being rocked, for moving the gear wheel on the shaft into and out of operative relationship with the gear wheel actuated by the driving wheel of the tractor, and connecting means for connecting said cranks to said bar.

5. A tractor-driven plow in combination with a cultivator comprising a shaft extending in the longitudinal direction of the plow, a plurality of cultivator elements on said shaft arranged to operate on the earth which passes away from the breast of the plow, a bar connected to the beam of the plow and extending in under the rear part of the tractor, lifting means for said bar, and straps for suspending the bar to the lifting means.

6. A tractor-driven plow comprising the combination as set forth in claim 5 with adjusting means for varying the height of the forward end of the bar connected to the beam of the plow.

7. A tractor-driven plow comprising the combination as set forth in claim 5 with adjusting means for varying the height of the forward end of the bar connected to the beam of the plow, said adjusting means comprising a worm mounted on the tractor, a rocker arm having a toothed sector thereon in engagement with said worm and means for operatively connecting said rocker arm to the forward end of said bar.

8. A tractor-driven plow comprising the combination as set forth in claim 5, with a traction bow on the tractor and a resilient arm on the beam of the plow, said resilient arm engaging the traction bow so as to provide a yielding transmission of the tractive effort from the tractor to the plow.

OSCAR PANENGEN.